(12) United States Patent
Alexandru et al.

(10) Patent No.: US 10,084,778 B2
(45) Date of Patent: *Sep. 25, 2018

(54) COMMUNICATION DEVICE IDENTIFICATION

(71) Applicant: FREESCALE SEMICONDUCTOR, INC., Austin, TX (US)

(72) Inventors: Georgel Bogdan Alexandru, Bucharest (RO); Ioan-Virgil Dragomir, Bucharest (RO)

(73) Assignee: NXP USA, Inc., Austin, TX (US)

( * ) Notice: Subject to any disclaimer, the term of this patent is extended or adjusted under 35 U.S.C. 154(b) by 156 days.

This patent is subject to a terminal disclaimer.

(21) Appl. No.: 14/953,143

(22) Filed: Nov. 27, 2015

(65) Prior Publication Data
US 2017/0093856 A1    Mar. 30, 2017

(30) Foreign Application Priority Data
Sep. 25, 2015    (RO) .................................. 2015 00695

(51) Int. Cl.
*H04L 29/06*    (2006.01)
(52) U.S. Cl.
CPC ...... *H04L 63/0876* (2013.01); *H04L 63/0471* (2013.01); *H04L 63/061* (2013.01)

(58) Field of Classification Search
CPC .................. H04L 63/061; H04L 63/0471; H04L 63/0876
See application file for complete search history.

(56) References Cited

U.S. PATENT DOCUMENTS

| | | | |
|---|---|---|---|
| 7,907,900 B2 | 3/2011 | Amendola | |
| 2007/0206546 A1 | 9/2007 | Alberth, Jr. et al. | |
| 2013/0010960 A1 | 1/2013 | Ho et al. | |
| 2013/0259230 A1* | 10/2013 | Polo | H04L 63/0272 380/270 |
| 2014/0105396 A1 | 4/2014 | Engelien-Lopes | |
| 2017/0093561 A1 | 3/2017 | Alexandru et al. | |

FOREIGN PATENT DOCUMENTS

EP    2608478 A1    6/2013

OTHER PUBLICATIONS

Non-Final Office Action dated May 19, 2017 for U.S. Appl. No. 14/953,133, 12 pages.

* cited by examiner

*Primary Examiner* — Beemnet Dada

(57) ABSTRACT

A peripheral device and central device in a communication network, such as a Bluetooth Low Energy network, maintain privacy while establishing a connection. During the connection set-up, energy may be saved in the peripheral device by linking the advertising address of the peripheral device to the resolvable private address of the central device, thereby minimizing the search effort of the peripheral device.

20 Claims, 10 Drawing Sheets

COMMUNICATION DEVICE IDENTIFICATION

CROSS REFERENCE TO RELATED APPLICATION(S)

The present application claims priority to Romanian Patent Application No. RO A 2015 00695, entitled "COMMUNICATION DEVICE IDENTIFICATION," filed on Sep. 25, 2015, the entirety of which is herein incorporated by reference. The present application is also related to co-pending U.S. application Ser. No. 14/953,133, entitled "DENIAL-OF-SERVICE ATTACHE PROTECTION FOR A COMMUNICATION DEVICE," filed on Nov. 27, 2017.

FIELD OF THE INVENTION

The invention relates to the field of communication and specifically to setting up communication between a central device and a peripheral device.

BACKGROUND OF THE INVENTION

Privacy is a known problem in communication, in particular in wireless communication. Devices communicating wirelessly provide a unique identification, such as an address, in the process of setting up a connection. This unique identification allows others to track and trace these devices, which may compromise privacy.

A way of preventing the transmission of a unique address is to have a random address for each connection, or to have a resolvable private address. A resolvable private address is an address that is generated with at least a secret shared between the devices. A standard using resolvable private addresses is the Bluetooth v4.0, also known as Bluetooth Low Energy (BLE) or Bluetooth smart.

The Bluetooth Low Energy standard describes pairing: setting up a connection between a central device and a peripheral device. A disadvantage of this BLE technology is that each device receiving a resolvable private address should use the shared secret of each known device to determine whether the connecting device is a known device. This involves a considerable amount of computing, which in turn requires a considerable amount of energy. In portable devices, the available amount of energy is typically limited.

BRIEF DESCRIPTION OF THE DRAWINGS

The invention will be apparent from and elucidated with reference to the embodiments described by way of example in the following description and with reference to the accompanying drawings, in which.

The figures are purely diagrammatic and not drawn to scale. In the figures, elements which correspond to elements already described may have the same reference numerals.

DETAILED DESCRIPTION OF EMBODIMENTS

A central device and a peripheral device in a communication network, such as a Bluetooth Low Energy (BLE) network, can hide their identities from other devices while setting up a connection by using an advertising address or a resolvable private address (RPA) from which their identities cannot readily be derived. However, for the devices involved in setting up the connection, the computational effort to determine each other's identity is considerable, as it requires checking the resolvable private address using all available identity resolving keys (IRK) until a match is found.

In embodiments of the invention, the required computational effort is significantly reduced by comparing a part of the address with precomputed cryptographic values. In some embodiments, the required computational effort can even further be reduced by using an address which contains a compliance value indicating whether such a precomputed cryptographic value exists. By reducing the computational effort, the invention also reduces the energy consumption of the communication devices.

The invention will be explained with reference to wireless networks and devices, in particular wireless networks complying with the Bluetooth Low Energy (BLE) standard. However, the invention is not so limited and may also be applied in wireless networks which fail to comply with the Bluetooth Low Energy standard, or in wired networks.

Figure 1:
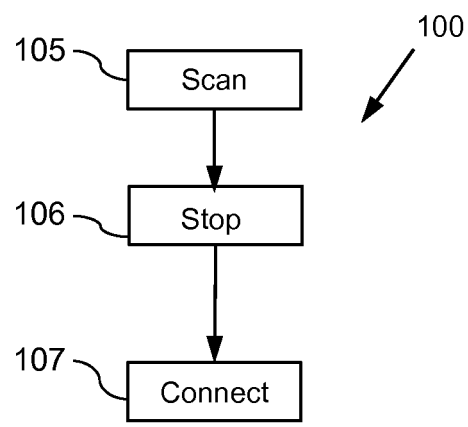
FIG. 1 schematically shows a flow diagram of a method of a central device establishing a connection with a peripheral device according to the prior art.

FIG. 1 shows a flow diagram 100 of actions taken by a central device establishing a connection while maintaining its privacy by hiding its identity in accordance with the prior art. During scanning for new peripheral devices, the central device scans (105) with an advertising address in the scan message. The identity of the scanning central device cannot readily be derived from the advertising address.

As soon as the central device detects a peripheral device, the central device stops scanning (106). When the scanning has stopped, the central device and the peripheral device connect (107).

Figure 2:
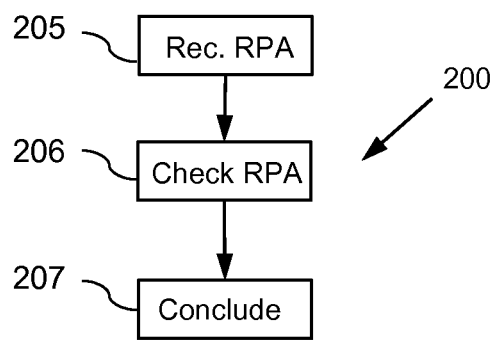
FIG. 2 schematically shows a flow diagram of a method of a peripheral device establishing a connection with a central device according to the prior art.

FIG. 2 shows a flow diagram 200 of actions taken by a peripheral device establishing a connection while maintaining privacy according to the prior art. During the establishment of the connection, the central device may use a resolvable private address (RPA), which is received by the peripheral device in (205). To verify the identity of the central device, the peripheral device checks (206) the received resolvable private address (RPA) with all identity resolving keys (IRKs) available to the peripheral device. After the check is completed, the resolution procedure is concluded (207).

Doing the check for all stored IRKs requires for each IRK the execution of a cryptographic function, such as a (keyed)

hash function, with the IRK as key and a first part of the RPA as input to the function. The result of the cryptographic function is compared with a second part of the RPA. The execution of a cryptographic function, such as a keyed hash function, is computationally demanding. Hence a repeated execution of such a function should be avoided, also because it requires a relatively large amount of energy and may deplete the batteries of battery-powered devices. Embodiments of the invention are configured to solve this problem.

Figure 3:
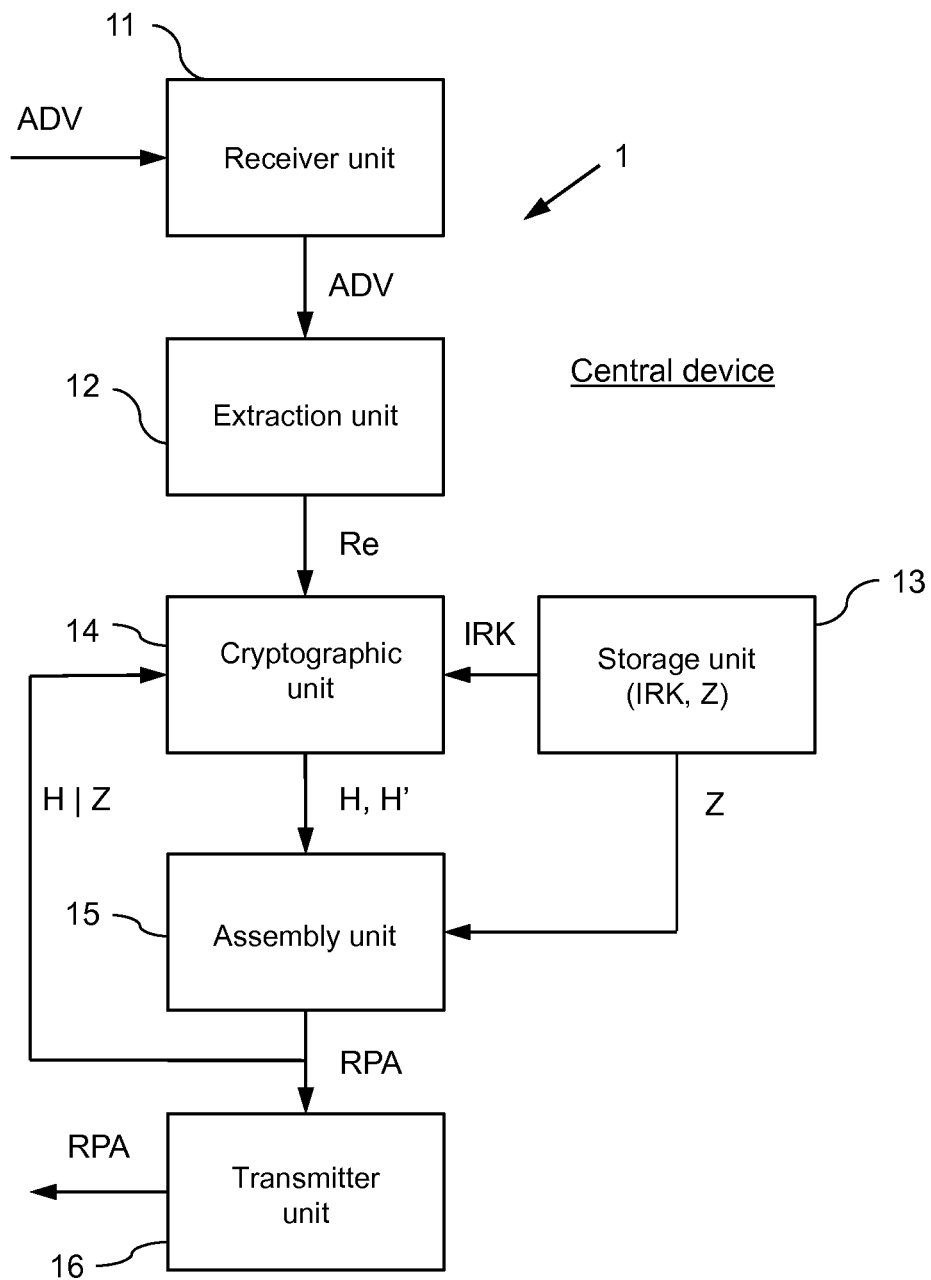
FIG. 3 schematically shows an embodiment of a central device according to an embodiment of the invention.

An exemplary embodiment of a central device according to the invention is schematically illustrated in FIG. 3. The central device 1 shown in FIG. 3 includes a receiver unit 11, an extraction unit 12, a storage unit 13, a cryptographic unit 14, an assembly unit 15 and a transmitter unit 16. A central device according to the invention may include additional units, such as a control unit, a power unit and an antenna unit.

Figure 4:
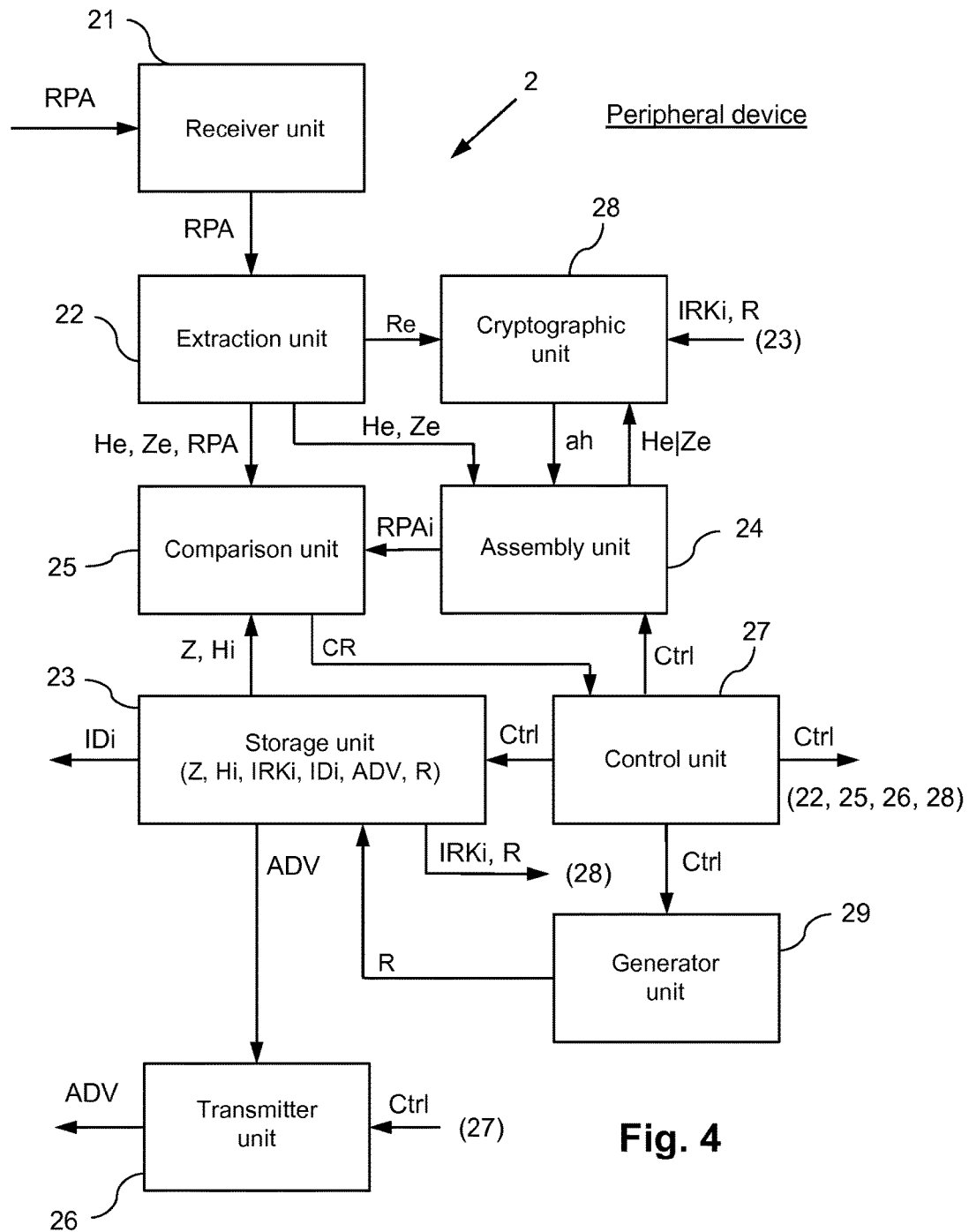
FIG. 4 schematically shows an embodiment of a peripheral device according to an embodiment of the invention.

The central device 1 as illustrated is configured to receive an advertising address ADV from a peripheral device, such as the peripheral device 2 illustrated in FIG. 4, and to transmit a resolvable private address RPA in response.

The receiver unit 11 is configured to receive the advertising address ADV from a peripheral device. The receiver unit is preferably configured for wireless communication, for example wireless communication compatible with the Bluetooth Low Energy (BLE) standard, but may also be configured for wired communication. In some embodiments, the receiver unit 11 may be constituted by a USB port.

The extraction unit 12 can be configured to extract a part R of the advertising address ADV. This address part R is preferably constituted by the two least significant bytes of the advertising address, but may also be constituted by other bytes (or bits) of the advertising address. The address part R is used to include an identification of the peripheral device in the resolvable private address RPA.

The storage unit 13 is configured to store an identity resolving key IRK. The identity resolving key is a secret key which can be shared between the central device and one or more peripheral devices. This sharing of the secret key is preferably done before the devices are used for setting up regular communication, for example when initiating the devices or when installing a network.

The cryptographic unit 14 is configured to cryptographically process, using the identity resolving key IRK, the extracted part R of the advertising address to obtain a cryptographic value H. In a preferred embodiment, the cryptographic value H can be written as:

$$H = ah(IRK,R)$$

where ah is a keyed hash function which uses the identity resolving key IRK to cryptographically process the extracted address part R. The resulting cryptographic value H constitutes at least part of a resolvable private address RPA. That is, the cryptographic value H can be used as resolvable private address RPA (that is, the RPA may be equal to H), but preferably the resolvable private address is extended by combining (for example concatenating) H with additional values so as to assemble an extended RPA.

In a preferred embodiment, this extension of the resolvable private address is achieved by concatenating the cryptographic value H with a value Z, which may be referred to as compliance value as it can be used to indicate that a device complies with the invention. The compliance value Z is, in the embodiment shown, stored in the storage unit 13, and may be stored when initiating the devices or when installing a network, for example. Accordingly, the resolvable private address RPA can, in this embodiment, be written as:

$$RPA = (H|Z),$$

where "|" denotes concatenation. It will be clear that extending the resolvable private address will increase its fault tolerance and decrease the probability that the address is not unique.

In a preferred embodiment, the resolvable private address is further extended by cryptographically processing the RPA and then concatenating it with its previous, unprocessed value. Accordingly, the cryptographic unit 14 may be further configured to cryptographically process, using the identity resolving key IRK, the resolvable private address RPA to produce an intermediate cryptographic value (H'), while the assembly unit 15 may be further configured to concatenate the intermediate cryptographic value H' and the resolvable private address RPA to extend the resolvable private address. This can be written as:

$$H' = ah(IRK,H|Z),$$

where ah is preferably a keyed hash function, but may also be another cryptographic function involving a key, and:

$$RPA = H'|H|Z = ah(IRK,H|Z)|H|Z$$

or:

$$RPA = ah(IRK,RPA^*)|RPA^*,$$

where RPA* is the shorter version of the RPA and is equal to H|Z.

It is noted that for the purpose of these concatenations, the assembly unit 15 may have a memory capable of temporarily storing the cryptographic value H. Alternatively, the cryptographic value H may temporarily be stored in the storage unit 13. It is further noted that in the present embodiment the assembly unit 15 is configured for assembling values, such as the resolvable private address, by concatenation. It will be understood that the assembly unit 15 may be configured for other ways of combining values, for example by interleaving bits or bytes of two or more values.

The transmitter unit 16 is configured to transmit the resolvable private address RPA to the peripheral device. Although more than one peripheral device may receive the resolvable private address, typically only one peripheral device will have an advertising address ADV from which the value R is derived.

An exemplary embodiment of a peripheral device according to the invention is schematically illustrated in FIG. 4. The peripheral device 2 shown in FIG. 4 includes a receiver unit 21, an extraction unit 22, a storage unit 23, an assembly unit 24, a comparison unit 25, a transmitter unit 26, a control unit 27, a cryptographic unit 28 and a generator unit 29. A peripheral device according to the invention may include additional units, such as a power unit and an antenna unit. In the example shown, the control unit 27 controls the extraction unit 22, the storage unit 23, the assembly unit 24, the comparison unit 25, the transmitter unit 26, the cryptographic unit 28 and the generator unit 29. The control unit 27 may include, for example, a processor and an associated memory, which memory may store instructions causing the processor to carry out its control functions.

The peripheral device 2 as illustrated in FIG. 4 is configured to receive a resolvable private address RPA and to derive a central device identity from the RPA. The peripheral device 2 illustrated in FIG. 4 is also configured to produce an advertising address ADV which includes an indication of the identity of the peripheral device, the indication being the address part R of the advertising address ADV, as discussed above.

The peripheral device 2 is shown to include a receiver unit 21 which is configured to receive a resolvable private address RPA from the central device. The receiver unit supplies the received RPA to the extraction unit 22, which is configured to extract a cryptographic value He from the received resolvable private address.

The storage unit 23 is configured to store precomputed cryptographic values Hi and associated central device identifiers IDi. It is noted that these values and identifiers are preferably stored during the initialisation of the peripheral device, or during the initialisation of a communication network of which the peripheral device is a part.

It is noted that the central device identifiers IDi are associated with the cryptographic values in such a way that for each cryptographic value Hi a (and preferably only one) central device identifier IDi can be found. The cryptographic values and the central device identifiers may be linked through a common index (i), which may refer to a storage location. In some embodiments, the central device identifiers IDi may be identical to the identity resolving keys IRKi of the central devices, thus removing the need to store both the identifier ID and the identity resolving key IRKi of a central device. In other embodiments, the central device identifiers IDi may each include an address, such as an IP address.

The comparison unit 25 of the peripheral device is configured to compare the extracted cryptographic value He with the stored cryptographic value Hi and to produce a first comparison result CR. A comparison result CR can be either positive or negative. A positive result indicates that there is a match and that, in this particular example, the stored cryptographic value Hi is identical to the extracted cryptographic value He. A negative results indicates that there is no match and that, in this particular example, the stored cryptographic value Hi is not identical to the extracted cryptographic value He.

The control unit 27 is configured to retrieve, in response to a positive first comparison result, a central device identifier IDi associated with the cryptographic value Hi from the peripheral device storage unit 23. That is, when the extracted and retrieved cryptographic values match, the corresponding central device identifier is retrieved from the storage unit 23.

The control unit 27 is further configured to cause, in response to a negative first comparison result, the peripheral device comparison unit 25 to compare the extracted cryptographic value He with a subsequent stored cryptographic value Hi. That is, when there is no match between the extracted and retrieved cryptographic values, the extracted cryptographic value is compared with the next cryptographic value retrieved from memory, until a match is found or the stored cryptographic values are exhausted.

As discussed above with reference to FIG. 3, the RPA may consist of the cryptographic value He (or H in FIG. 3) alone, but preferably consists of a concatenation (or other combination) of the cryptographic value H and at least one other value, such as a compliance value Z and/or a cryptographically processed version of a concatenation of the cryptographic value H and the compliance value Z.

Accordingly, in the embodiment of FIG. 4 the storage unit 23 is configured to store identity resolving keys IRKi and associated central device identifiers IDi which are preferably paired by an index (i) which may refer to a storage location. The storage unit 23 may further be configured to store a compliance value Z, which compliance value is shared between the peripheral device and at least one central device. The extraction unit 22 can be configured to extract a compliance value Z from the received resolvable private address RPA. The peripheral device comparison unit 25 is configured to compare the stored compliance value Z with the extracted compliance value Ze and to produce a second comparison result CR.

A positive second comparison result indicates that the received RPA complies with the invention and that a match may be found using the extracted cryptographic value He and the precomputed cryptographic values Hi, as described above. A negative comparison result indicates that the received RPA does not comply with the invention and that a regeneration of at least part of the resolvable private key is necessary.

In the embodiment of FIG. 4, the control unit 27 is configured to cause, in response to a negative second comparison result, the peripheral device assembly unit 24 and the peripheral device cryptographic unit 28 to regenerate a cryptographic value Hi by using the extracted address part Re and a stored identity resolving key IRKi. The control unit 27 can also be configured to cause the peripheral device comparison unit 25 to compare the regenerated cryptographic value Hi and the extracted cryptographic value He to produce a third comparison result CR.

A positive third comparison result indicates that a match is found using the cryptographic values. A negative third comparison result indicates that no match is found.

The control unit 27 may be configured to retrieve from the peripheral device storage unit 23, in response to a positive third comparison result, a central device identifier IDi associated with the stored identity resolving key IRKi used for producing the matching cryptographic value Hi. The control unit 27 may further be configured to retrieve from the peripheral device storage unit 23, in response to a negative third comparison result, a subsequent identity resolving key IRKi (where the index i has been incremented) to regenerate another cryptographic value Hi while using the extracted address part Re.

It is noted that in some embodiments the identity resolving key IRKi may be used as central device identifier, and that in those embodiments no separate central device identifier IDi needs to be provided. Such embodiments utilize the fact that the identity resolving key IRKi is typically unique for the central device, thus allowing the central device to be identified by its identity resolving key.

The control unit 27 can further be configured to cause, in response to a negative third comparison result, the cryptographic unit 28 to regenerate a cryptographic value Hi using a subsequent stored identity resolving key IRKi.

In the embodiment of FIG. 4, a generator unit 29 is provided to supply the address part R. The generator unit 29 is controlled by the control unit 27, which may cause the generator unit 29 to generate a new value of the address part R, which may be stored in the storage unit 23. Alternatively, the generator unit 29 may directly supply the address part R to the cryptographic unit 28.

The advertising address ADV may be stored in the storage unit 23 in its entirety, or without the address part R as a partial advertising address. The address part R may be stored in the storage unit 23 as a separate item. The transmitter unit 26 may be configured for combining a partial advertising address with the address part R if they are stored as separate items.

The cryptographic unit 28 is preferably configured for cryptographic processing using a keyed hash function, although other cryptographic functions involving a key, such as DES (Data Encryption Standard) functions, may also be used. The advantage of a hash function is its relative simplicity and hence the reduced computational effort.

The transmitter unit 26 of the peripheral device 2 may be configured to transmit, controlled by the control unit 28, an advertising address ADV to a central device. The advertising address ADV can include the address part R, which can be used by a central device as described above with reference to FIG. 3.

At least one of the receiver unit 21 and the transmitter unit 26 may be configured for wireless communication, for example wireless communication compatible with the Bluetooth Low Energy (BLE) standard. However, at least one of the receiver unit 21 and the transmitter unit 26 may additionally or alternatively be configured for wired communication.

Figure 5:
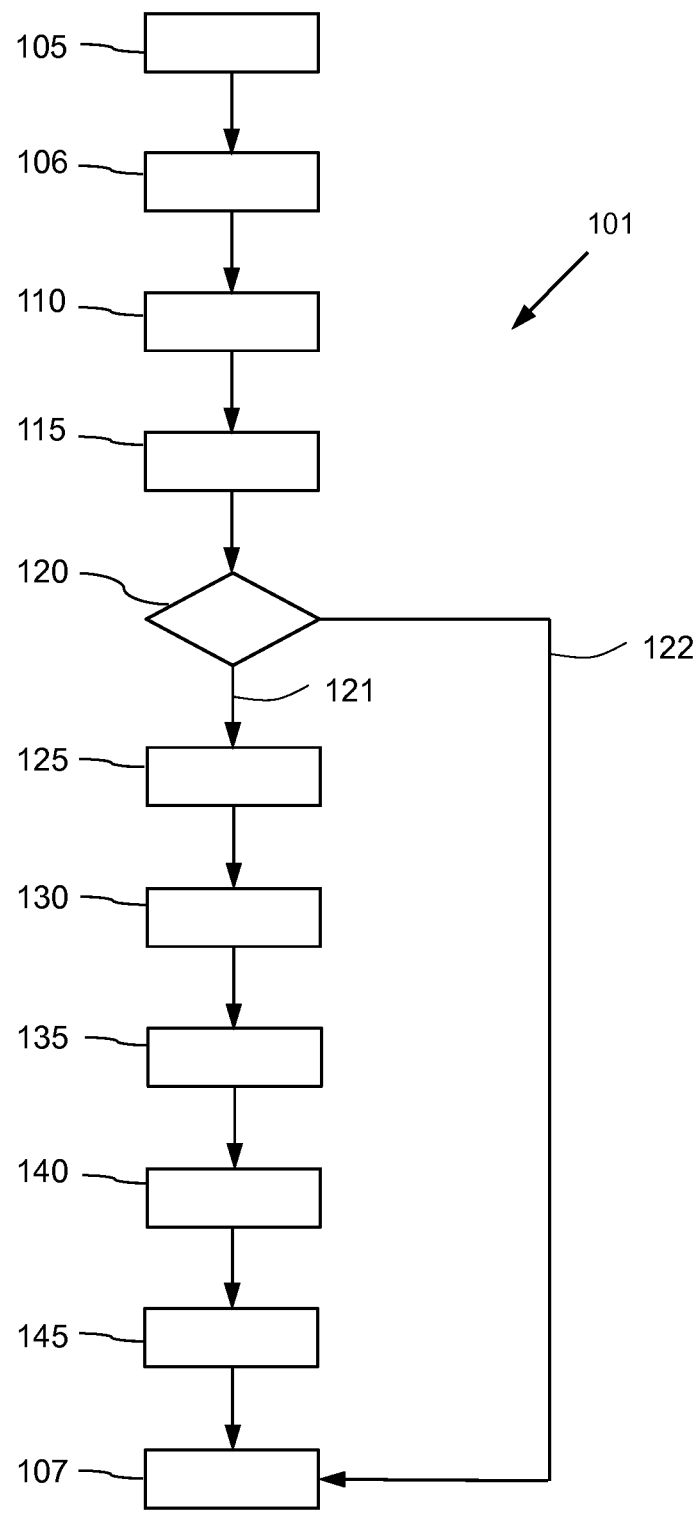
FIG. 5 schematically shows a flow diagram of a first embodiment of a method for a central device establishing a connection in accordance with the invention.

FIG. 5 shows a flow diagram 101 of an embodiment of a method of a central device establishing a connection according to the invention. During scanning for new peripherals, the central device scans with an advertising address in the scan message (105).

As soon as the central device detects a peripheral device, the central device stops scanning (106). Following the stop of the scanning the central device extracts a first central device portion of the advertising address of the peripheral device (110). The first central device portion may be any portion of the advertising address or the complete advertising address. If a portion of the advertising address is extracted, it is advantageous to extract a portion of the advertising address on a byte boundary. In a preferred embodiment two bytes are extracted. In a further embodiment the two least significant bytes make up the first central device portion.

Extraction of the first central device portion is followed by extracting a second central device portion (115) from the advertising address. The second central device portion of the advertising address may be of any size or may be one or more bytes of the advertising address. In an embodiment the second central device portion has a size of one byte.

Extraction of the second central device portion is followed by matching (120) the second central device portion with a first central device tag. The first central device tag may be of any size or may be one or more bytes. In an embodiment, the first central device tag has a size of one byte. Preferably, the size of the first central device tag is equal to the size of the second central device portion. If the second central device portion does match (121) the first central device tag, the central device will assume that the peripheral device is compliant with aspects of the invention: both devices are capable of setting up a connection in accordance with the invention (for this reason the central device tag may also be referred to as compliance value). If the second central device portion does not match (122) the first central device tag, the central device will assume that the peripheral device is not compliant. In case of non-compliancy the central device will jump to the connecting state (107).

In case a compliant peripheral device or a central device does not discriminate between compliant and non-compliant peripheral devices, a first central device hash value is computed (125). The first central device hash value may be computed according to the BLE standard and can be computed using a shared key, such as an IRK, as a first input parameter and the first central device portion as a second input parameter. The first central device hash value will appear random to a peripheral device not having the knowledge of the shared key.

Optionally, extracting the first central device portion (110) may also be carried out after extracting the second central device portion (115) and matching the second central device portion with the first central device tag (120).

The extraction of the second central device portion (115), followed by the matching (120), provides the advantage of identifying a compliant peripheral device. In an embodiment these two actions may be omitted if the central device does not discriminate between a compliant and a non-compliant peripheral device.

After computing the first central device hash value, a second central device tag is inserted (130) in the first central device hash value. The second central device tag may be of any size and may, for example, have a length of one or more bytes. Inserting the second central device tag in the first central device hash value may also be accomplished by concatenation. In an embodiment, the first central device hash value has a length of 24 bits and the second central device tag has a length of 8 bits. In an embodiment, the second central device tag replaces the highest bits of the first central device hash value, for example the highest 8 bits of a 24 bit central device hash value. In an embodiment, the second central device tag has the binary value bx01dd.dddd, where d means a value of 0 or 1. In an embodiment, the bit values of the second central device tag set to 'd' do not change the bit values of the first central device hash value. In an embodiment, the second tag has the hexadecimal value of 0x55.

Optionally, inserting the second central device tag in the first central device hash value (130) may be omitted.

After inserting a second central device tag (130), a second hash central value is computed (135). The second central device hash value may be computed according to the BLE standard. The second central device hash value is computed using a shared key, such as an IRK, as a first input parameter and the first central device hash value as a second input parameter. The second central device hash value will appear random to a peripheral device not having the knowledge of the shared key.

Optionally, computing the second central device hash value (135) may be replaced by generating a central device number substituting the second central device hash value. Preferably, the central device number is randomly selected. More preferably, the central device number is different for each peripheral device. Even more preferably, the central device number is different for every connection set-up for each peripheral device.

Following the computing of the second central device hash value, the second central device hash value (135) is concatenated with the first and second central device hash values (140) to form an RPA. Optionally, a third number is also concatenated in addition to the first and second central device hash values to form the RPA.

Following the concatenation, the central device sets the RPA (145) as random address for the peripheral device. The central device uses the RPA specifically for communication with this peripheral device. Preferably, the RPA is not used for any other peripheral device communication or for any other peripheral device. The setting of the RPA is followed by connecting (107) with the peripheral device.

Figure 6:
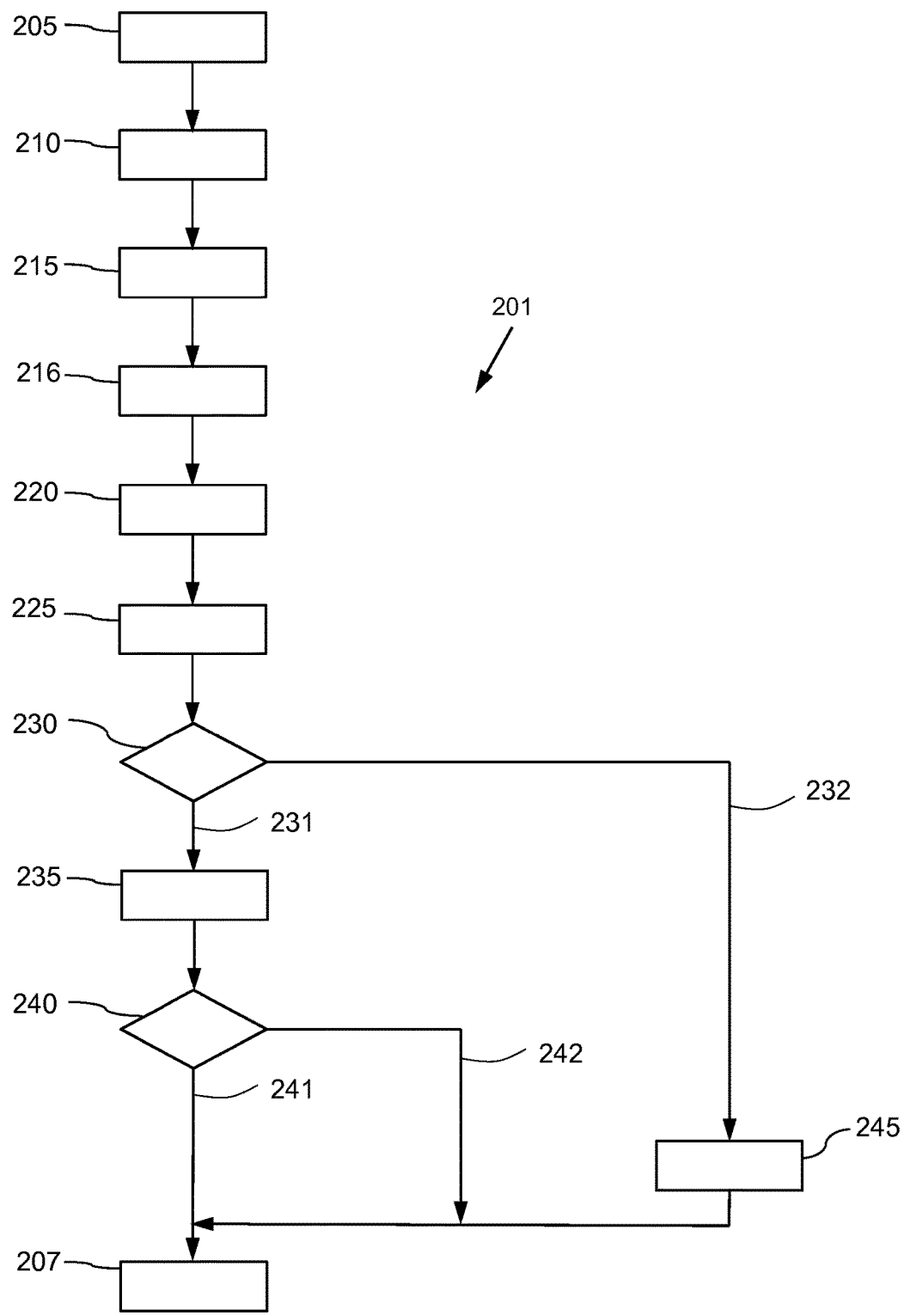
FIG. 6 schematically shows a flow diagram of a first embodiment of a method for a peripheral device establishing a connection in accordance with the invention.

FIG. 6 shows a flow diagram 201 of an embodiment of a method for a peripheral device establishing a connection. The peripheral device initially connects (205) with a central device using an RPA.

Then a peripheral device hash value is computed (210). The peripheral device hash values may be computed according to the BLE standard. A peripheral device hash value is computed using a shared key, such an IRK, as a first input parameter and a first peripheral device number as a second input parameter. The first peripheral device number may be a random number or a nonce. The first peripheral device number may also be changed over time. A plurality of first hash values are computed for a respective number of shared keys. The same first peripheral device number is kept at least constant during the computation of the plurality of peripheral device hash values. In an embodiment the first peripheral device number has a size of 16 bits.

As long as the first peripheral device number is kept the same and the shared key stays the same, the peripheral device hash value will not change. It can be advantageous to store the peripheral device hash values for later use, instead of computing them every time a connection is set up. In case the flow diagram uses precomputed peripheral device hash values, the flow diagram may start with inserting a second peripheral device tag (215).

Following the computing of the peripheral device hash values (210), a first peripheral device number and a second peripheral device number are concatenated (215). The second peripheral device number may include one or more bits and preferably includes several bytes. The second peripheral device number may be a concatenation of a second peripheral device tag and a random number. In an embodiment, the second peripheral device tag has the binary value bx01dd.dddd, where d means a value of 0 or 1. In an embodiment, the bit values of the second peripheral device tag set to 'd' are randomly selected. In another embodiment, the second peripheral device tag has the hexadecimal value of 0x55. In another embodiment, the random number has a size of 24 bits or 32 bits. A combination of embodiments for the second peripheral device are foreseen.

The concatenation forms an advertising address of the peripheral device, which advertising address is used for advertising the presence of the peripheral device. A central device may scan this advertising address and respond to this advertising address according to the flow diagram of FIG. 5.

The concatenation (215) is followed by the advertising of the advertising address by the peripheral device (216). During advertising, the peripheral device may receive an RPA from a central device, while the peripheral device enters the receiving RPA state (220). The RPA is a response to the advertising address and is part of the set-up of a connection.

In response to receiving an RPA, the peripheral device extracts a second peripheral device portion from the RPA (225). It is advantageous to extract the second peripheral device portion of the advertising address on a byte boundary. In a preferred embodiment two bytes are extracted. In a further embodiment the two least significant bytes make up the second peripheral device portion.

Once the second peripheral device portion is extracted, the second peripheral device portion is matched against a first peripheral device tag (230). The first peripheral device tag may be of any size but preferably includes one or more bytes. In an embodiment, the first peripheral device tag has a size of one byte. Preferably, the size of the first peripheral device tag is equal to the size of the second peripheral device portion.

If the second peripheral device portion does match the first peripheral device tag (231), the peripheral device will assume that the central device is compliant. In an embodiment, the first peripheral device tag has the binary value bx01dd.dddd, wherein d means a value of 0 or 1. In an embodiment, the bit values having the value 'd' are neglected in the match. In another embodiment, the first peripheral device tag has the hexadecimal value of 0x55. In another embodiment, the second peripheral device portion has a size of one byte and is the fifth byte of an RPA having a length of six bytes, the most significant byte being the fifth byte.

If the second peripheral device portion does not match the first peripheral device tag (232), the peripheral device will assume that the central device is not compliant. In case of non-compliancy, the peripheral device may decide to check all IRKs of non-compliant central devices (245). If an IRK of a non-compliant central device is found that matches the RPA, or if all IRKs of non-compliant central devices are checked, the resolution procedure comes to an end (207).

If the second portion does match the second tag, a first peripheral device portion is then extracted from the RPA (235). The first peripheral device portion may be have any number of bits. Preferably, the first peripheral device portion has a size of at least one byte, more preferably at least one byte placed on a byte boundary in the RPA. In an embodiment, the first peripheral device portion has a size of 16 bits and constitutes the third and fourth bytes of an RPA having a length of six bytes, the most significant byte being the fifth byte.

Optionally, extracting a second peripheral device portion and matching the second peripheral device portion with a first peripheral device tag (230) may be omitted. If these actions are omitted, receiving an RPA (225) is followed by extracting a first peripheral device portion from the RPA.

After extracting the first portion, it is matched with the peripheral device hash values (240). The peripheral device hash values may be pre-computed as specified when computing peripheral device hash values (210) or computed when needed, for example during this check. If values are pre-computed, the values may be stored in a memory. If values are computed during the matching, less memory is needed compared to the pre-computed option and the computing of peripheral device hash values (210) is executed (partly) during matching the first portion with the peripheral device hash values (240).

The first peripheral device portion may also contain more than only a hash value, such as a CRC or other check to ensure validity of a hash value contained in the first peripheral device portion. The hash value may also be further transformed by for example a light or simple security algorithm. A reason to transform is to be able to reuse the peripheral device hash values. It will be clear to the reader this transform has to be done before advertising the advertising address (216), preferably before concatenating the first peripheral device number and the second peripheral device number (215).

If the first peripheral device portion does not match any of the peripheral device hash values, there are two options to continue. The first option (242) is to end the resolution procedure (207). The second option is to reconsider if the central device is compliant by continuing in the non-compliant branch with checking all IRKs of non-compliant central devices (245). If thereafter an IRK is found that matches the RPA, or if all IRKs of non-compliant central devices are checked without a match, the resolution procedure comes to an end (207).

If the first portion does match a peripheral device hash value (241), the resolution procedure ends (207). In an embodiment, for completeness, it may be possible to check the other peripheral device hash values for multiple matches.

In case of multiple matches either any match from the matches, such as the first match, may be selected, or the peripheral device may repeat the resolution procedure by selecting a new first peripheral device number and calculating a new peripheral device hash value for all IRKs (210).

Figure 7A:
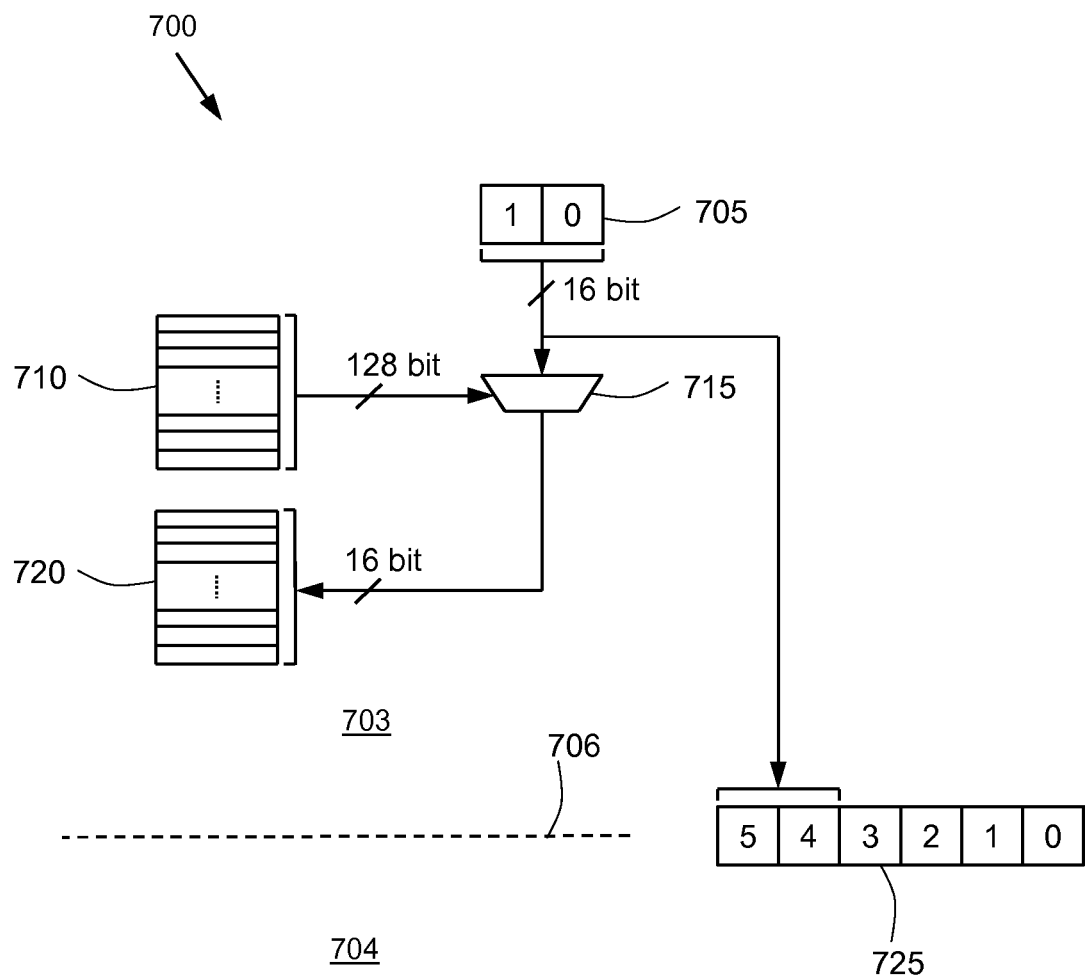
FIGS. 7A-7C schematically show an information flow between two compliant devices according to an embodiment of the invention.
Figure 7B:
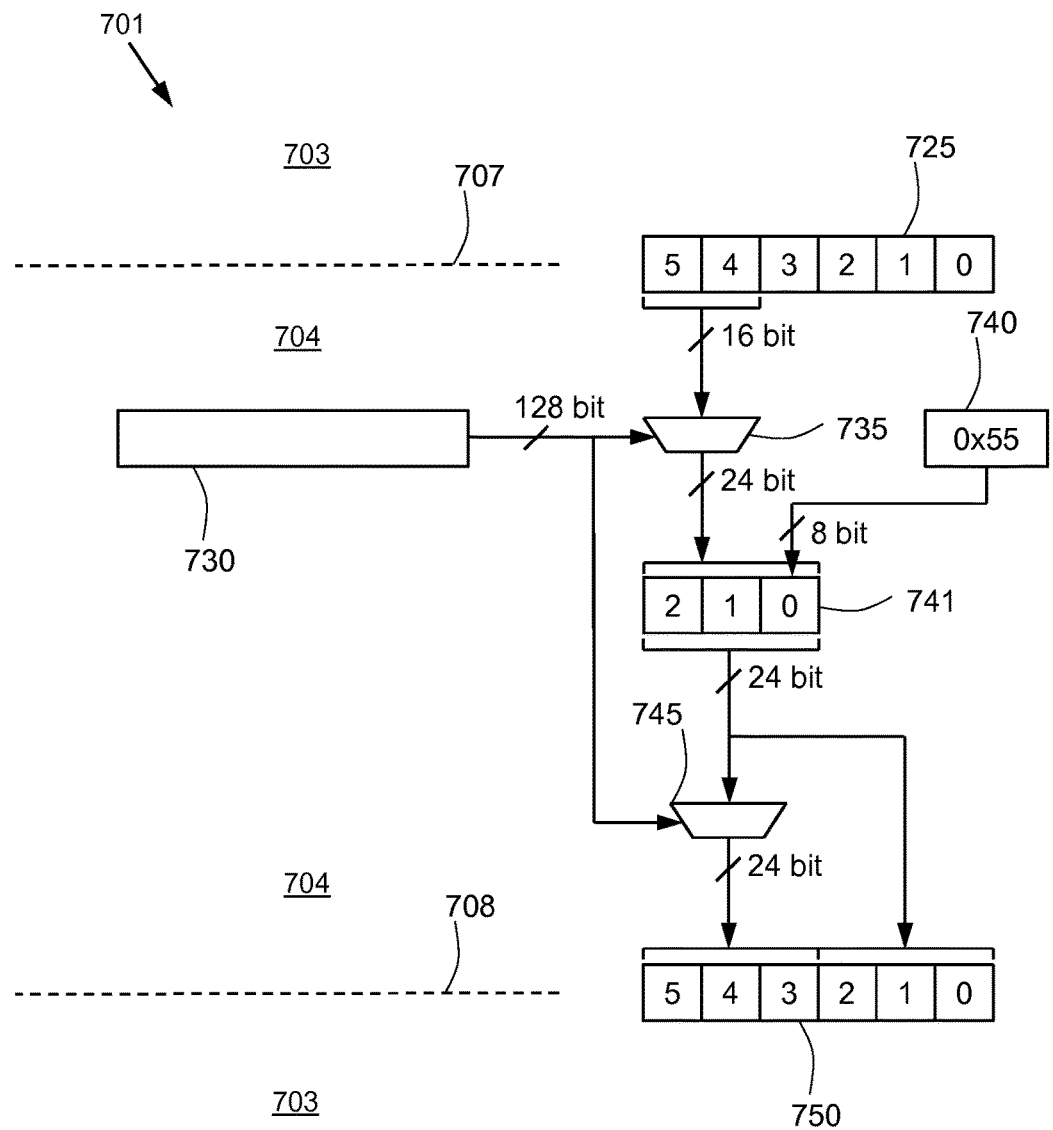
Figure 7C:
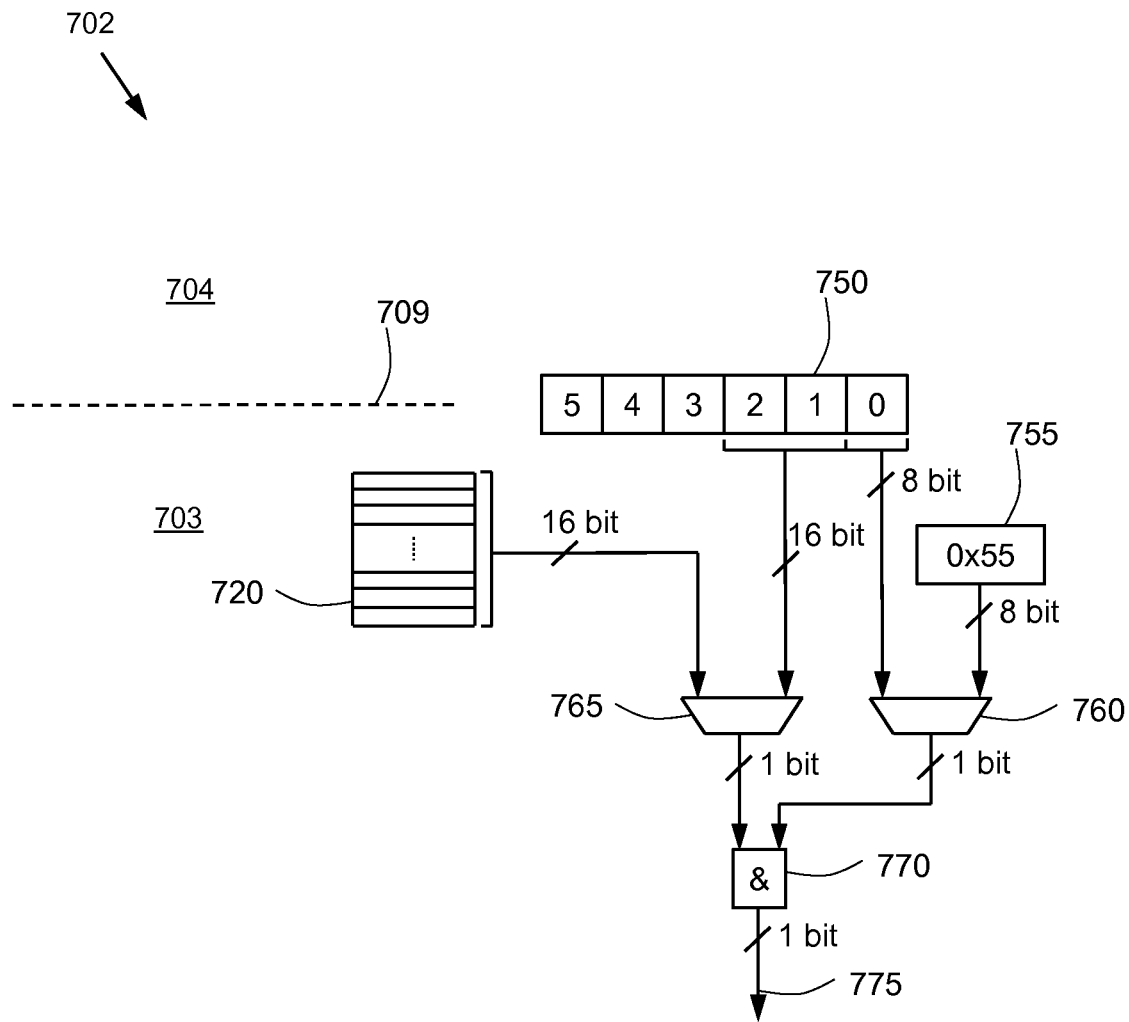

FIGS. 7A-7C show an information flow between a central device and a peripheral device according to the invention. The separation between the devices is shown by dotted lines 706, 707, 708, 709. For each dotted line the peripheral device side 703 and central device side 704 are shown. The information flow diagrams show boxes identifying information.

The information crossing a dotted line in the information flow diagram is information which is communicated between the devices according to the invention, which may also be referred to as compliant devices. The information communicated from a peripheral device to a central device is an advertising address (ADV) 725 of the peripheral device. The information communicated from a central device to a peripheral device is a resolvable private address (RPA) 750.

Although the embodiment is shown with little-endianness (a little-endian system stores the least-significant byte at the lowest memory address), the embodiments are not limited to little-endianness implementations. For endianness the information is split in bytes. An example of a standard using little-endianness is the Bluetooth low energy standard as specified in paragraph 5.2 part E in Bluetooth specification v4.0 [Vol 2].

FIG. 7A shows the first part 700 of the information flow diagram. A start is made with the selection of a first peripheral device number 705 of 16 bits. The first peripheral device number may be a randomly selected number. The first peripheral device number may be a permanent number or semi-permanent number. The first peripheral device number is put into the advertising address 725 as the least two significant bytes, wherein the advertising address has a size of 48 bits. The advertising address is transmitted from the peripheral device and may be received by a central device.

A peripheral hash unit 715 takes as input the first peripheral device number and combines this with an identity resolving key (IRK). Several IRKs 710 may be present in the peripheral device. A result of the peripheral hash unit is a peripheral device hash value having a size of 16 bits that can be stored in peripheral hash store 720.

Each IRK is associated with a central device. This association is not shown in the information diagram. Furthermore the plurality of peripheral device hash values, which are computed, are associated with a respective IRK, which was the input of the peripheral hash unit leading to the peripheral device hash value. Preferably the peripheral device hash value computed are only associated with compliant central devices.

It will be clear that the computation of the peripheral device hash value may be diverted to the information flow diagram in FIG. 7C. The peripheral device hash value store shown in the FIGS. 7A and 7C may than be omitted.

FIG. 7B shows the second part 701 of the information flow diagram. The information flow starts with the reception of the advertising address 725.

A first central device hash unit 735 of the central device takes as input the lowest 16 bits from the advertising address and combines these with an IRK 730 of the central device. The 16 bits extracted from the advertising address are the same bits concatenated making up the advertising address by the peripheral device.

A result of the first central device hash unit has, in the present embodiment, a length of 24 bits. The most significant bits of the result are substituted by a second central device tag 740 to obtain a first composed value 741. The least significant bits are formed by the first central device hash value, the most significant bits are formed by the second central device tag. The second central device tag may be any value. The second central device tag may be a constant or varying value. The second central device tag for the BLE standard has a binary fixed value of bx01dd.dddd. "d" indicates "don't care", hence may have a value of "0" or "1". The second central device tag selected in this embodiment has a fixed hexadecimal value 0x55.

A second central device hash unit 745 of the central device takes as input the first composed value 741 and combines this with an IRK 730 of the central device. A result of the second central device hash unit has a length of 24 bits.

In an embodiment, the hash function of the first central device hash unit is shared with the second central device hash unit, thus preventing the circuitry for the hash function to be implemented in duplicate.

An RPA 750 is formed by the concatenation of the result of the second central device hash unit and the first composed value. In an embodiment the RPA has a size of 48 bits.

The information flow in the central device results in the RPA 750 being transmitted from the central device to the peripheral device.

FIG. 7C shows the third part 702 of the information flow diagram. The information flow starts with the reception of the RPA 750 at the peripheral device.

A first extraction is done to extract 16 bits from the RPA resulting in a first peripheral device portion. A second extraction is done to extract 8 bits from the RPA, resulting in a second peripheral device portion. The second peripheral device portion can be equal to the 8 most significant bits of the RPA. The first peripheral device portion can be equal to the 16 most significant bits of the RPA after the bits extracted for the first peripheral device portion.

A first peripheral matching unit matches a second peripheral device portion with a first peripheral device tag, resulting in a first peripheral match result. The first peripheral device tag may be any value, such as a constant or a varying value. The first peripheral device tag for the BLE standard has a binary fixed value of bx01dd.dddd, where "d" indicates "don't care" and hence may have a value of "0" or "1". The first peripheral device tag selected in this embodiment has a fixed hexadecimal value of 0x55 (which is binary "1010101").

A second peripheral matching unit matches a first peripheral device portion with each peripheral device hash value from the peripheral device hash value store 720, resulting in a second peripheral match result for each entry in the peripheral device hash value store. The result of each match for each entry may be stored in a temporary storage, and may be handled sequentially. For the sake of simplicity of the figure, this is not shown in FIG. 7C.

A logic "AND" port combines the first peripheral match result and the second peripheral match result to a matching central device 775. The match is ideally present for only one peripheral device hash value from the peripheral device hash value store 720. If multiple matches are present, the peripheral device may either decide to redo the procedure described in the information flow diagrams with another random number 705 as seed, or select one central device from the multiple matches as the most likely central device. Another option is to make a further selection which central device is connecting from other information provided by the central device to the peripheral device. The other information may include encrypted and non-encrypted information. In case of non-encrypted information, this may be information on capabilities transmitted along with the RPA. Even another option is to delay the selection of the central device and continue with the selection of central devices providing a match. Hence the selection of the central device is delayed until more information is provided by the central device to the peripheral device.

The dependency of the RPA on the advertising address requires the central device to maintain an RPA for each peripheral device.

The substitution of the most significant bits of the first composed value 741 with the second central device tag 740 may also be done after the use of the first composed value as input parameter to the second central device hash value 745.

The BLE standard maintains privacy during pairing with the use of the output of a hash function. This hash function is specified in paragraph 6.1 part H in Bluetooth specification v4.0 [Vol 2]. The use of the hash function is specified in paragraph 2.2.2 part H in Bluetooth specification v4.0 [Vol 3]. The hash function has a first input parameter and a second input parameter. The first parameter may be a shared secret called an identity resolving key (IRK). The second parameter may be a nonce value or a random value. The IRK has a typical size of 128 bits. The RPA may be provided according to paragraph 10.8.2.2 part C in Bluetooth specification v4.0 [Vol 3]. The RPA has a typical size of 48 bits. An advertising address has a typical size of 48 bits.

The hash unit in this invention may implement the hash function specified in the BLE (Bluetooth Low Energy) standard. Other hash functions are known to the person skilled in the art and may be used in this invention.

The hash function according to the BLE standard provides a 24 bits hash value. A further reduction of 24 bits to for example 16 bits may be provided by including a truncation of the highest 8 bits from the 24 bits value in the hash unit.

Compliant in the context of this document means that the device is using an addressing scheme according to the invention. This compliancy may be a central device or a peripheral device. The check whether a compliant device is connecting may be done in several ways, as described previously in this document.

Figure 8:
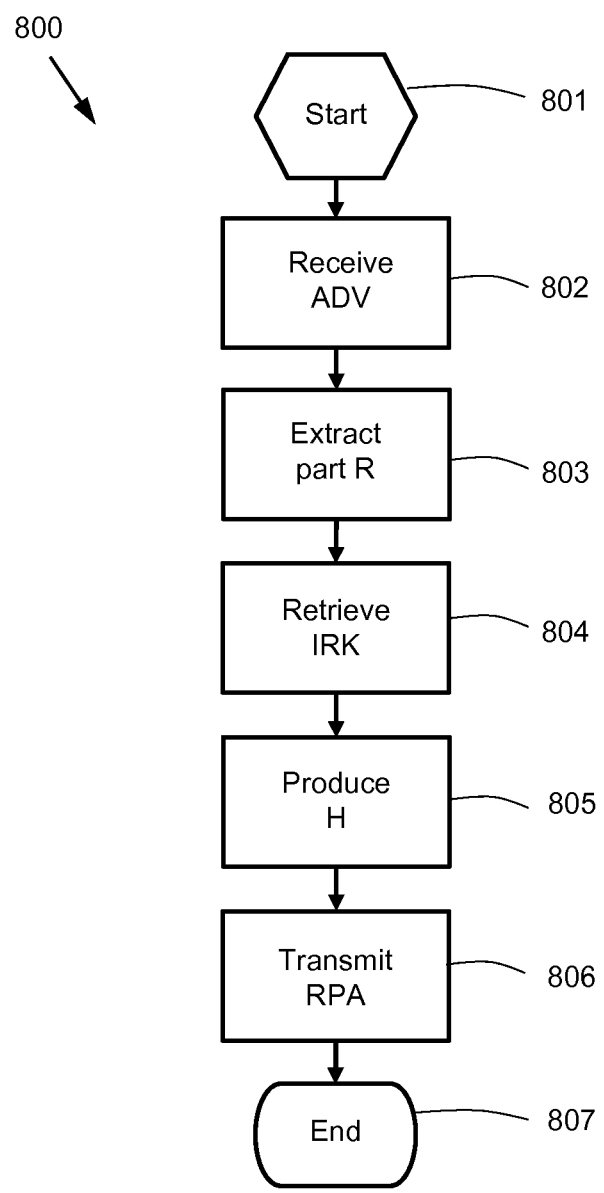
FIG. 8 schematically shows a flow diagram of a second embodiment of a method for a central device establishing a connection in accordance with the invention.

An exemplary embodiment of a method according to the invention, as may be applied by a central device, is schematically illustrated in FIG. 8. After the method 800 starts (801), an advertising address ADV is received from the peripheral device (802). Then a part of the advertising address is extracted (803) to provide an address part R. Subsequently (804), an identity resolving key (IRKi) is retrieved from memory. The identity resolving key (IRKi) is a secret key which is shared between the central device and the peripheral device but is kept secret for other parties.

The extracted address part R is then (805) cryptographically processed, using the stored identity resolving key (IRKi), to obtain a central device cryptographic value (H). This central device cryptographic value (H) constitutes at least part of a resolvable private address (RPA). In other embodiments, the RPA is extended by combining the central device cryptographic value with other values.

The resolvable private address RPA is transmitted (806) to the peripheral device, after which this embodiment of the method ends (807).

Figure 9:
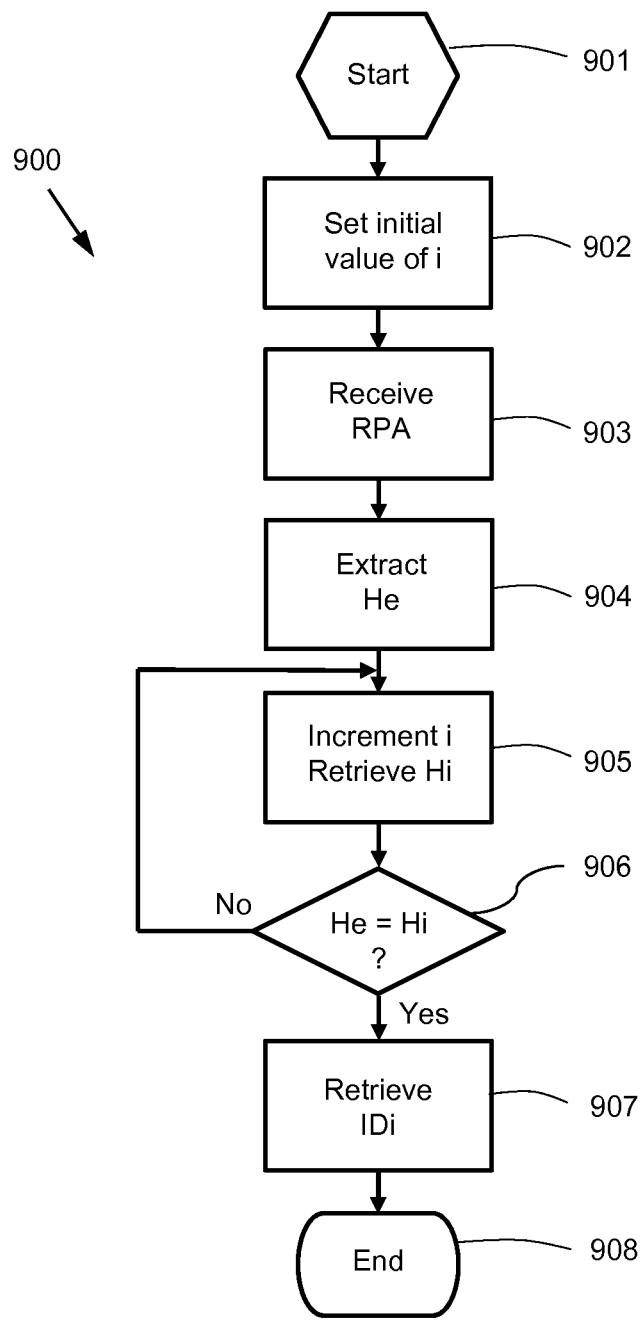
FIG. 9 schematically shows a flow diagram of a second embodiment of a method for a peripheral device establishing a connection in accordance with the invention.

An exemplary embodiment of a method according to the invention, as may be applied by a peripheral device, is schematically illustrated in FIG. 9. The method 900 starts (901) and sets an initial value of an index i (902). This initial value may be 0 or −1, for example, or may be equal to a memory location (minus an increment, see 905 below) where a first value to be retrieved is stored.

The peripheral device receives an RPA from a central device (903). Then, a cryptographic value He is extracted from the received resolvable private address (904). The index is incremented and a first stored cryptographic value Hi is retrieved from storage (905), using the index (i). The index increment may be equal to 1, but other values may also be used, such as the number of memory locations used for each stored cryptographic value.

The retrieved cryptographic value Hi (for example H1 in a first iteration) is compared with the extracted cryptographic value He (906). If the two values match, a positive comparison result is produced ("Yes") and the index (i) is used to retrieve a central device identifier IDi from storage (907). The central device identifier IDi (for example ID1 for an index equal to 1) is associated with a cryptographic value Hi (for example H1 for an index equal to 1) and identifies the central device from which the particular cryptographic value Hi originates. When the central device is successfully identified, the method ends (908).

If the retrieved cryptographic value Hi (for example H1 in a first iteration) and the extracted cryptographic value He fail to match (906), a negative comparison result is produced ("No"). Then, the index is incremented again and a second stored cryptographic value Hi is retrieved from storage (905), using the incremented index (i). The retrieved cryptographic value Hi (for example H2 in a second iteration) is compared with the extracted cryptographic value He (906). This process is repeated until a match is found, or the number of stored cryptographic values Hi is exhausted.

In the embodiment of FIG. 9, a central device identifier IDi is used to indicate the identity of the central device. In some embodiments, the central device identifier may be identical to the central device identity resolving key IRKi. In other embodiments, a central device identifier may be omitted altogether and may be replaced with a confirmation that a matching central device has been found.

An embodiment of the invention can be summarised as a central device configured for communication with a peripheral device, the central device including a central device receiver unit configured to receive an advertising address from the peripheral device, a central device extraction unit configured to extract a part of the advertising address, a central device storage unit configured to store an identity resolving key, wherein the identity resolving key is a secret key shared between the central device and the peripheral device, a central device cryptographic unit configured to cryptographically process, using the identity resolving key, the extracted part of the advertising address to obtain a central device cryptographic value, wherein the central device cryptographic value constitutes at least part of a resolvable private address, and a central device transmitter unit configured to transmit the resolvable private address to the peripheral device.

Another embodiment of the invention can be summarised as a peripheral device configured for communication with a central device, the peripheral device including a peripheral device receiver unit configured to receive a resolvable private address from the central device, a peripheral device extraction unit configured to extract a cryptographic value from the received resolvable private address, a peripheral device storage unit configured to store precomputed cryptographic values and associated central device identifiers, a peripheral device comparison unit configured to compare the extracted cryptographic value with a stored cryptographic value and to produce a first comparison result, and a control unit configured to retrieve, in response to a positive first comparison result, a central device identifier associated with the cryptographic value from the peripheral device storage unit, and further configured to cause, in response to a negative first comparison result, the peripheral device comparison unit to compare the extracted cryptographic value with any subsequent stored cryptographic value.

In the foregoing specification, the invention has been described with reference to specific examples of embodiments of the invention. It will, however, be evident that various modifications and changes may be made therein without departing from the scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Devices functionally forming separate devices may be integrated in a single physical device. Also, the units and circuits may be suitably combined in one or more semiconductor devices.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps than those listed in a claim. Furthermore, the terms "a" or "an," as used herein, are defined as one or as more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A central device configured for establishing communication with a peripheral device, the central device comprising
 a central device receiver unit configured to receive an advertising address from the peripheral device;
 a central device extraction unit configured to extract an address part from the advertising address to provide an extracted address part;
 a central device storage unit configured to store an identity resolving key, wherein the identity resolving key is a secret key shared between the central device and the peripheral device;
 a central device cryptographic unit configured to cryptographically process, using the identity resolving key, the extracted address part to obtain a central device cryptographic value;
 a central device assembly unit configured to assemble a resolvable private address by using the central device cryptographic value; and
 a central device transmitter unit configured to transmit the resolvable private address to the peripheral device.

2. The central device according to claim 1,
 wherein the central device storage unit is further configured to store a compliance value, wherein the compliance value is shared between the central device and the peripheral device; and
 wherein the central device assembly unit is further configured to combine the central device cryptographic value and the compliance value to assemble the resolvable private address.

3. The central device according to claim 2,
 wherein the central device cryptographic unit is further configured to cryptographically process, using the identity resolving key, the resolvable private address to produce an intermediate cryptographic value; and
 wherein the central device assembly unit is further configured to combine the intermediate cryptographic value and the resolvable private address to extend the resolvable private address.

4. The central device according to claim 1, wherein the central device cryptographic unit is configured to use a keyed hash function.

5. The central device according to claim 1, wherein at least one of the central device receiver unit and the central device transmitter unit is configured for wireless communication.

6. A peripheral device configured for establishing communication with a central device, the peripheral device comprising
 a peripheral device receiver unit configured to receive a resolvable private address from the central device;
 a peripheral device extraction unit configured to extract a cryptographic value from the received resolvable private address;
 a peripheral device storage unit configured to store at least one precomputed cryptographic value and at least one associated central device identifier;
 a peripheral device comparison unit configured to compare the extracted cryptographic value with a stored cryptographic value and to produce a first comparison result; and
 a control unit configured to retrieve, in response to a positive first comparison result, a central device identifier associated with the cryptographic value from the peripheral device storage unit, and further configured to cause, in response to a negative first comparison result, the peripheral device comparison unit to compare the extracted cryptographic value with any subsequent stored cryptographic value.

7. The peripheral device according to claim 6,
 wherein the peripheral device storage unit is configured to store identity resolving keys and associated central device identifiers;
 wherein the peripheral device storage unit is further configured to store an address part and a compliance value, wherein the compliance value and the address part are shared between the peripheral device and at least one central device;
 wherein the peripheral device extraction unit is configured to extract a compliance value from the received resolvable private address; and
 wherein the peripheral device comparison unit is configured to compare the stored compliance value with the extracted compliance value and to produce a second comparison result.

8. The peripheral device according to claim 7,
wherein the control unit is configured to cause, in response to a negative second comparison result, the peripheral device extraction unit to extract an address part from the received resolvable private address and to cause the peripheral device assembly unit and the peripheral device cryptographic unit to regenerate a cryptographic value by using the extracted address part and a stored identity resolving key;
wherein the control unit is configured to cause the peripheral device comparison unit to compare the regenerated cryptographic value and the extracted cryptographic value to produce a third comparison result, and to retrieve, in response to a positive third comparison result, a central device identifier associated with the stored identity resolving key from the peripheral device storage unit; and
wherein the control unit is further configured to cause, in response to a negative third comparison result, the peripheral device assembly unit and the peripheral device cryptographic unit to regenerate another cryptographic value by using the extracted address part and a subsequent stored identity resolving key.

9. The peripheral device according to claim 6, wherein the peripheral device cryptographic unit is configured to use a keyed hash function.

10. The peripheral device according to claim 6, further comprising a peripheral device transmitter unit configured to transmit an advertising address of the peripheral device to a central device, wherein the advertising address comprises the address part.

11. The peripheral device according to claim 10, wherein at least one of the peripheral device receiver unit and the peripheral device transmitter unit is configured for wireless communication.

12. A method for a central device to establish communication with a peripheral device, the method comprising
receiving an advertising address from the peripheral device;
extracting a part of the advertising address to provide an extracted part;
retrieving an identity resolving key, wherein the identity resolving key is a secret key shared between the central device and the peripheral device; and
cryptographically processing, using the stored identity resolving key, the extracted part of the advertising address to obtain a central device cryptographic value, wherein the central device cryptographic value constitutes at least part of a resolvable private address; and
transmitting the resolvable private address to the peripheral device.

13. The method according to claim 12, further comprising
storing a compliance value, wherein the compliance value is shared between the central device and the peripheral device; and
assembling the central device cryptographic value and the compliance value to produce the resolvable private address.

14. The method according to claim 13, further comprising cryptographically processing, using the identity resolving key, the resolvable private address to produce an intermediate cryptographic value; and
assembling the intermediate cryptographic value and the resolvable private address to extend the resolvable private address.

15. The method according to claim 12, wherein the cryptographical processing involves a keyed hash function.

16. The method according to claim 12, wherein at least one of the receiving and the transmitting is carried out wirelessly.

17. A method for a peripheral device to establish communication with a central device, the method comprising
receiving a resolvable private address from the central device;
extracting a cryptographic value from the received resolvable private address;
comparing the extracted cryptographic value with a stored cryptographic value and producing a first comparison result, wherein each stored cryptographic value is associated with a central device identifier;
retrieving, in response to a positive first comparison result, a central device identifier associated with the cryptographic value; and
comparing, in response to a negative first comparison result, the extracted cryptographic value with any subsequent stored cryptographic value.

18. The method according to claim 17, further comprising
extracting a compliance value from the received resolvable private address, wherein the compliance value is shared between the peripheral device and at least one central device;
comparing a stored compliance value with the extracted compliance value and producing a second comparison result;
extracting, in response to a negative second comparison result, an address part from the received resolvable private address and regenerating a cryptographic value by using the extracted address part and a stored identity resolving key;
comparing the regenerated cryptographic value and the extracted cryptographic value to produce a third comparison result;
retrieving, in response to a positive third comparison result, a central device identifier associated with the stored identity resolving key; and
regenerating, in response to a negative third comparison result, another cryptographic value by using the extracted address part and a subsequent stored identity resolving key.

19. The method according to claim 18, wherein the regenerating involves a keyed hash function.

20. The method according to claim 17, wherein at least one of the receiving and the transmitting is carried out wirelessly.

* * * * *